(12) United States Patent
Fu

(10) Patent No.: US 7,263,185 B2
(45) Date of Patent: Aug. 28, 2007

(54) KEY BASED DECIPHER INCLUDING ITS GENERATION, DISTRIBUTION AND USAGE

(75) Inventor: Xiaodong Fu, Fairfax, VA (US)

(73) Assignee: RealNetworks, Inc., Seattle, WA (US)

( * ) Notice: Subject to any disclaimer, the term of this patent is extended or adjusted under 35 U.S.C. 154(b) by 540 days.

(21) Appl. No.: 10/377,346

(22) Filed: Feb. 27, 2003

(65) Prior Publication Data

US 2004/0190713 A1    Sep. 30, 2004

(51) Int. Cl.
*H04L 9/30*    (2006.01)
*H04L 9/00*    (2006.01)

(52) U.S. Cl. .......................... 380/30; 380/29; 713/151

(58) Field of Classification Search ................ 713/151; 380/29, 30
See application file for complete search history.

(56) References Cited

U.S. PATENT DOCUMENTS

| | | | | |
|---|---|---|---|---|
| 4,405,829 | A * | 9/1983 | Rivest et al. .................. 380/30 |
| 5,297,207 | A * | 3/1994 | Degele ......................... 380/46 |
| 5,504,817 | A |  4/1996 | Shamir |
| 5,535,276 | A * | 7/1996 | Ganesan ...................... 713/155 |
| 5,892,899 | A |  4/1999 | Aucsmith et al. |
| 5,978,482 | A | 11/1999 | Dwork et al. |
| 5,999,627 | A * | 12/1999 | Lee et al. ..................... 380/30 |
| 6,141,698 | A * | 10/2000 | Krishnan et al. ........... 719/331 |
| 6,269,163 | B1 |  7/2001 | Rivest et al. |
| 6,578,150 | B2 |  6/2003 | Luyster |
| 2002/0159589 | A1 * | 10/2002 | She et al. ...................... 380/37 |
| 2004/0005054 | A1 * |  1/2004 | Montgomery et al. ........ 380/30 |

OTHER PUBLICATIONS

Neal Koblitz, A Course in Number Theory and Cryptography Second Edition, p. 23-24.*
RSA, A Method for Obtaining Digital Signatures and Public-Key Cryptosystems 1998.*
S.L. Graham, R.L. Rivest, A Method for Obtaining Digital Signatures and Public-Key Cryptosystems.*

* cited by examiner

*Primary Examiner*—Nasser Moazzami
*Assistant Examiner*—Eleni Shiferaw
(74) *Attorney, Agent, or Firm*—Axios Law Group; Adam L. K. Philipp

(57) ABSTRACT

A decipher key based decipher with at least a portion of the decipher key dissolved into the decipher is disclosed. The decipher includes in-line instructions specifically designed to incrementally contribute to computation of $M^e$ Mod n, where e is a predetermined at least partially unique decipher key. In one embodiment, the decipher includes a first in-line instruction to set an output variable to equal to 1, and a second in-line instruction to set the output variable to equal to the square of the output variable modulus n. In another embodiment, the decipher includes in-line instructions that perform the incremental computation in accordance with an addition chain of e.

49 Claims, 5 Drawing Sheets

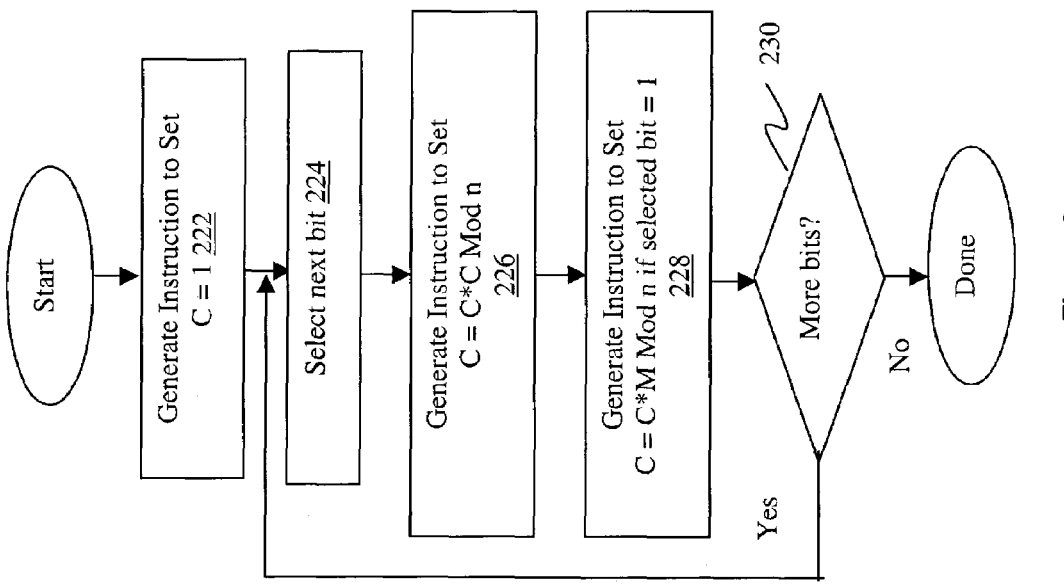
Figure 2c
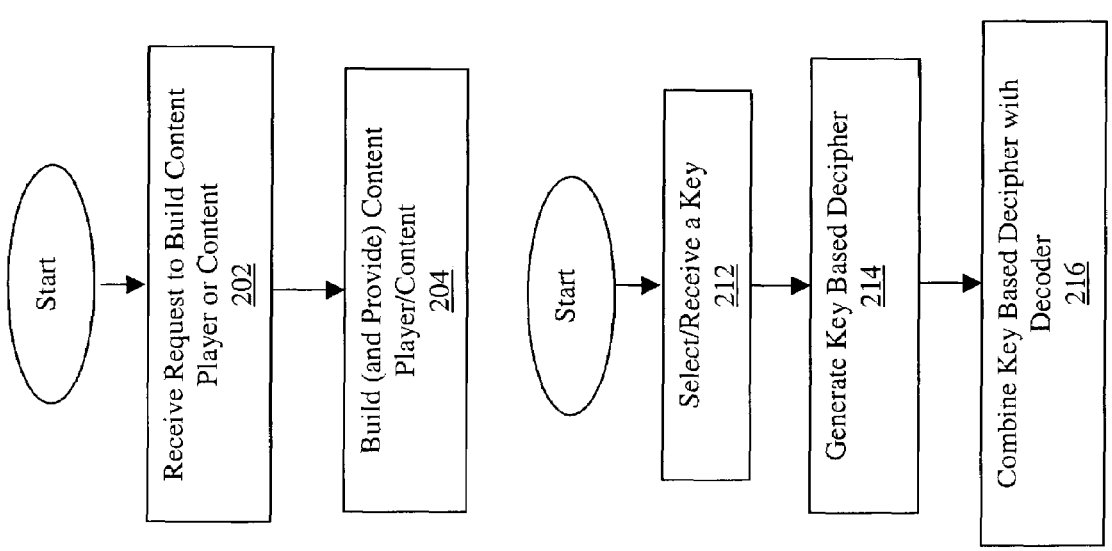
Figure 2a
Figure 2b

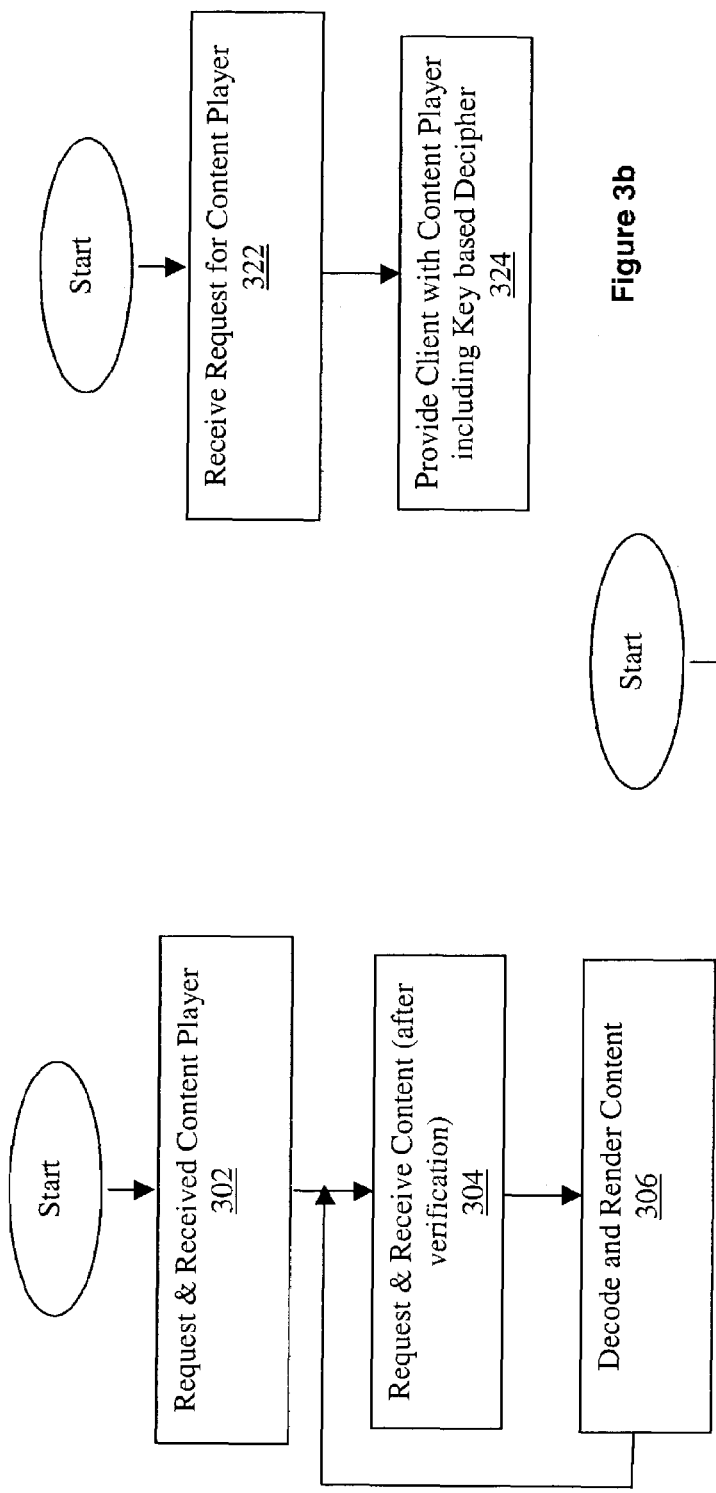

US 7,263,185 B2

KEY BASED DECIPHER INCLUDING ITS GENERATION, DISTRIBUTION AND USAGE

FIELD OF THE INVENTION

The present invention relates to the field of secure content distribution and consumption. More specifically, the present invention is related to a key based decipher, including its generation, distribution and employment in secure consumption of content.

BACKGROUND OF THE INVENTION

Advances in microprocessor, networking and related technologies have led to wide spread deployment and adoption of server-client based applications. In particular, with the advance of high speed public networks, such as the Internet, increasing amounts of rich content are being served and available for consumption by networked clients. Much of these rich contents are streamed in digital form to the client devices for consumption.

Unlike analog copies of the earlier era, the quality of each digital copy is as good as the original/master copy. As the processing capabilities of the client devices and the ease of exchanging data between a large number of geographically dispersed client devices continually to increase, the issue of protecting these rich content from misappropriation, i.e. unauthorized copying and/or re-distribution, has become increasingly important.

Resultantly, a large body of security techniques, including ciphering and deciphering techniques, have been developed, and employed in content distribution and consumption to protect the content from misappropriation. Among them are key based techniques, in particular, public key and private key techniques that involve modulus computations.

An example of one, such technique is the Rivest, Shamir and Adleman (RSA) public key and private key technique. Briefly, the RSA technique works as follows:
1. Two large prime numbers, p and q, are first generated;
2. A number n is set to pq;
3. A number m is set to (p−1)(q−1);
4. Next, a small number e, coprime to m, is chosen;
5. Then, d where de % m=1 is determined;
6. e and n, often referred to as the public key, are published;
7. d and n, often referred to as the private key, are kept secret;
8. Portions of content are corresponding encoded as Ms;
9. Each M is encrypted into a corresponding C by computing $M^e$ % n;
10. Each C is decrypted back into M by computing $C^d$ % n;

where x % y means the remainder of x divided by y.

In other words, the effectiveness of security techniques, such as RSA, are substantially dependent on keeping the private key, d and n in the case of RSA, secret. Unfortunately, the responsibility is often that of the client devices, which in general, are not considered to be sufficiently secured.

Various techniques to obfuscate and/or hide the keys are known and employed. Unfortunately, the robust techniques are often too complex to implement, and the relatively easy to implement ones are not robust enough.

Thus, a need exists to improve the security of public key and private key techniques, in particular, a need exists to more efficiently keeping the private key from being learned.

BRIEF DESCRIPTION OF THE DRAWINGS

The present invention will be described by way of exemplary embodiments, but not limitations, illustrated in the accompanying drawings in which like references denote similar elements, and in which:

FIGS. 2a-2c illustrate the operational flow of the relevant aspects of the production sever, including content player/content building and key based decipher generation, in accordance with one embodiment;

FIGS. 3a-3c illustrate the operational flow of the relevant aspects of the client devices, the player distribution servers, and the content distribution servers, in accordance with one embodiment;

DETAILED DESCRIPTION OF EMBODIMENTS OF THE INVENTION

The present invention includes a key based decipher component of a content player, and associated methods of operations to generate, distribute and use the key based decipher for secure content provision and consumption.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Terminology

Parts of the description will be presented in content streaming and security terminology consistent with the manner commonly employed by those skilled in the arts to convey the substance of their work to others skilled in the respective arts. In particular, in a server/client device, content, player and associated data may take the form of electrical, magnetic, or optical signals capable of being stored, transferred, combined, and otherwise manipulated through electrical and/or optical components of a processor, and its subsystems.

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Overview

Figure 1:
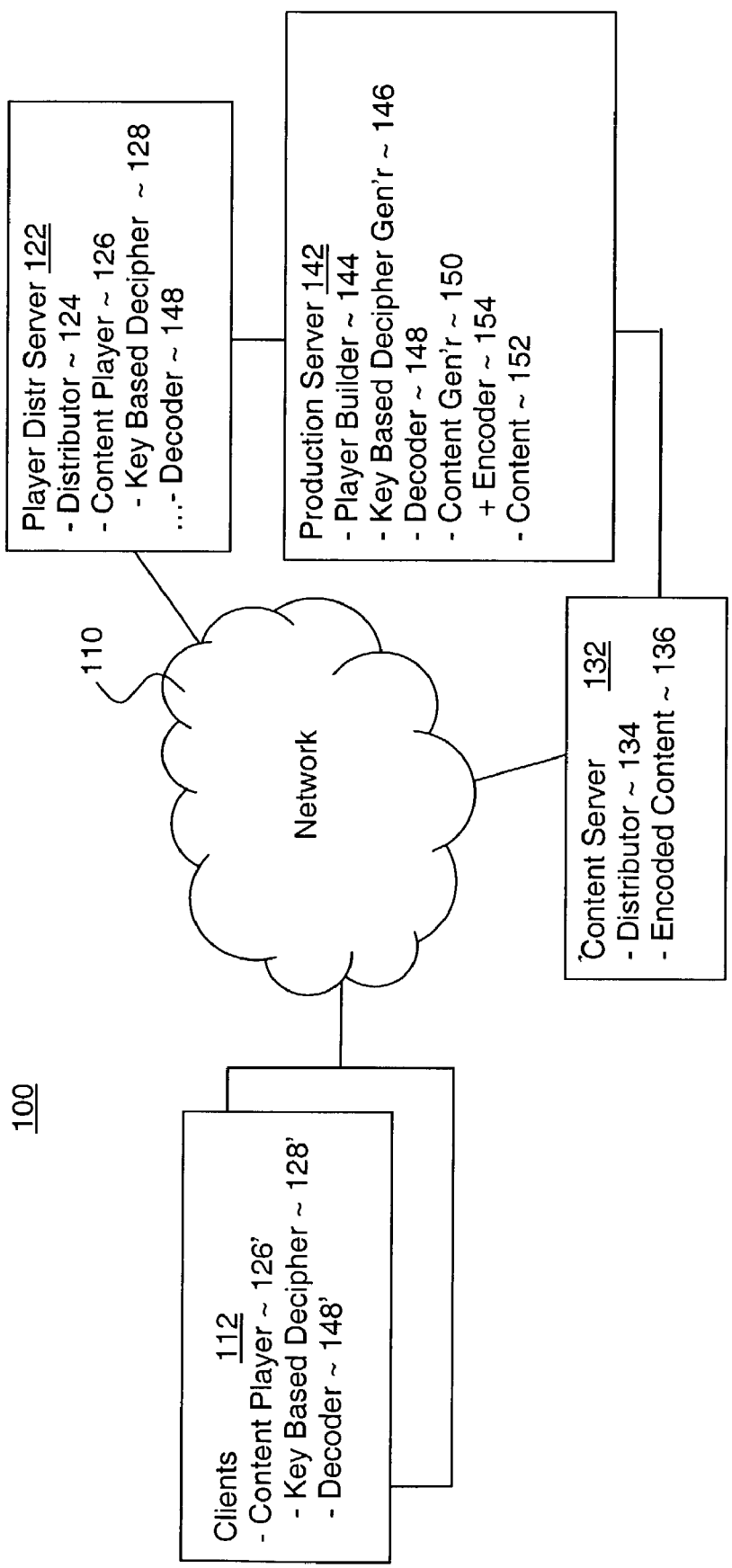
FIG. 1 illustrates a content provision and consumption environment having at least content player distribution servers, content distribution servers and content consuming client devices, where at least some of these servers/devices are incorporated with the teachings of the present invention, in accordance with one embodiment.

FIG. 1 illustrates an overview of a content provision and consumption environment, having a number of server and client devices, where selected ones of the server and client devices are incorporated with the teachings of the present invention, in accordance with one embodiment. As illustrated, for the embodiment, content provision and consumption environment 100 includes client devices or simply clients 112, content player distribution server 122, content server 132 and production server 142, coupled to each other as shown, i.e. via networks 110.

Production server 142 performs the function of building content player 126, and encoded content 136, and providing them to e.g. player distribution server 122 and content server 132 respectively. For the embodiment, production server 142 may include player builder 144, key based decipher generator 146, decoder 148, content generator 150 and content 152. Content generator 150 in turn may include encoder 154.

Player builder 144 performs the function of building content player 126 for distribution by distribution server 122. More specifically, player builder 144 performs the function by invoking key based decipher generator 146 to generate key based decipher 128, and combining the generated key based decipher 128 with a decipher key, if applicable, and decoder 148 to form content player 126. During operation, i.e. when content player 126 is used by a client 112 to request and consume encoded content 136, key based decipher 128 is employed to decipher access control information provided by content server 132 to access encoded content 136 of interest, to ensure content player 126 is a legitimate, i.e. properly licensed content player 126.

The exact nature of the access control information and the process of ensuring content player 126 is a legitimate or properly licensed content player, beyond the fact that deciphering of ciphered information is involved, is non-essential to the practice of the present invention. The access control information and the process may be any one of access control information and/or processes currently being practiced or to be designed.

Similarly, except for key based decipher 128, including its generator 146, and the fact that content player 126 includes key based decipher 128 and possibly, a decipher key, player builder 144 including decoder 148 may be any one of a number of these elements known in the art or to be designed.

Key base decipher 128, including its generation, and the inclusion of a decipher key will be further described below, after the overview description has been given for other elements illustrated in FIG. 1.

Content generator 150, on the other hand, performs the function of generating encoded content 136 for distribution by content server 132, using encoder 154 to encode content 152. Content generator 150, including encoder 154 may be any one of a number of these elements known in the art or to be designed.

Continuing to refer to FIG. 1, distribution server 122 performs the function of distributing content player 126 to requesting clients 112, which in turn may use the received content player 126 to request, receive and consume content 136 provided by content server 132. In other words, clients 112 and content server 132 perform the functions of requesting/consuming and providing content respectively.

For the embodiment, content server 132 may include content distributor 134. Clients 112 and content server 132, including content distributor 134, may be any one of a number of these devices known in the art or to be designed. For example, in the case of client 112, it may be a hand held palm-sized computing device, such as a mobile phone or pocket PC, a tablet computing device, a laptop computing device, a desktop computing device, a set-top box, and so forth. In the case of server 132, it may be an entry level, a mid-size or an array of high power servers. Further, the requested, provided and consumed content may be of any one of a number of types and/or forms, including but are not limited to audio, video, text, graphics, and so forth, or combinations thereof.

In addition to content player 126, distribution server 122 may be equipped with distributor 124, which performs the function of distributing content player 126 to a client 112 on request. Distributor 124 may distribute content player 126 with or without qualification, authentication and payment of fees. The distribution may also be performed in accordance with any protocol, format and/or speed. In other words, in general, distributor 124 may be any one of a number of distributors known in the art or to be designed.

As described earlier, content player 126 includes key based decipher 128 of the present invention, and optionally a decipher key and decoder 148. Upon installation or set up on a client 112, content player 126 performs for the client 112, the function of requesting and rendering content, which may include using decipher 128 in the validation process and/or decoder 148 to decode encoded content.

As will be described in more detail below, the enclosed decipher key may at most be used partially only. In other words, the decipher key may be included with content player 126 partly to obfuscate or confuse a party attempting to misappropriate content.

Key based decipher 128 performs the function of deciphering access control information with an unconventional, i.e. novel, design. As will be described in more detail below, key based decipher 128 is at least partially decipher key specific, with a portion of the decipher key being "dissolved" into decipher 128.

The term "dissolved" or "dissolution" as used herein refers to the fact that decipher 128 is hard "coded" or "wired" to decipher only ciphered content designed to be deciphered with decipher keys having the hard coded/wired portion. The situation is analogous to the dissolution of powder in a liquid. Upon dissolving the powder into the liquid, the existence of the powder may be inferred only from the characteristics of the liquid, but not observable in its natural state. For example, when sugar is dissolved in water, the presence of the sugar can only be inferred from the sweetness of the water, but not observable in its natural powder state. Similarly, the portion of the decipher key may only be inferred from the structure of decipher 128 but unobservable as an entity in its natural state (i.e. a binary number).

Accordingly, during operation, decipher 128 needs only be provided with the not "dissolved" portion of the decipher key. Thus, arbitrary values may be provided for the "dissolved" portion to obfuscate or confuse a party attempting to misappropriate the content. In the case where the entire decipher key is "dissolved" into decipher 128, arbitrary values for the entire "decipher key" may be provided to decipher 128 during operation to obfuscate and/or misdirect. However, such obfuscation is optional.

Resultantly, decipher 128 may not decipher ciphered access control information correctly if the access control information is not ciphered in a manner to be deciphered with a decipher key having the hard coded/wired portion. However, this seemingly more limiting in capability is abundantly compensated with the reduced need to obfuscate or hide the decipher key, when content player 126 is provided to a client 112 for use to consume content provided e.g. by content server 132. Further, a partially or entirely phony decipher key may be provided to obfuscate and/or misdirect. Thus, the counter intuitive approach actually results in an unexpected improvement in protecting content from misappropriation.

For the purpose of this application, hard coded/wired "instructions" may also be referred to as in-line "instructions".

Decoder 148 performs the function of decoding encoded content. Decoder 148 may be equipped to decode content encoded in accordance with one or more encoding approach/ standard. For example, decoder 148 may be equipped to decode content encoded in accordance with the MPEG3 and/or MPEG4 standard (MPEG=Motion Picture Experts Group). In other words, in general, decoder 148 may be any one of a number of decoders known in the art or to be designed.

Still referring to FIG. 1, network 110 may be any one of one or more public and/or private local, regional and/or wide area networks known in the art or to be designed.

Before further describing the present invention, and the various elements of FIG. 1, it should be noted that in alternate embodiments, the present invention may be practiced with one or more functions of distribution server 122, content server 132 and production server 142 to be further distributed among additional servers. Similarly, the present invention may be practiced with one or more of servers 122, 132 and 142 combined instead. Likewise, encoded content 136 may also be ciphered, and key based decipher 128 of the present invention may also be used to decipher the ciphered encoded content 136.

Content Player/Content Building Including Key Based Decipher Generation

FIGS. 2a-2c illustrate the operational flow of the relevant aspects of production server 142, including content player building, in particular, key based decipher generation, and content building, in accordance with one embodiment each.

As illustrated in FIG. 2a, during operation, production server 142 receives a request to build (and provide) content player 126 and/or encoded content 136, block 202. The request may be submitted in any one of a number of manners, including but are not limited to submission from a scheduled job, an operator of production server 142, player distribution server 122, content server 132 and so forth. In response, if the request is for building content player 126, production server 142 invokes content player builder 144 to build content player 126, and if applicable, provide built/ re-built content player 126 to distribution server 122, block 204. In particular, content player builder 144 invokes key based decipher generator 146 to generate key based decipher 128.

Referring now to FIG. 2b, during operation, content player builder 144 is provided with the length of the decipher key and the specified portion, on which the key based decipher 128 to be specifically generated for, block 212. In one embodiment, as described earlier, the specified "portion" may be the entire decipher key.

On receipt, content player builder 144 invokes key based decipher generator 146 to generate key based decipher 128 that is hard coded/wired specifically for the decipher key (having the specified portion), block 214.

On generation of key based decipher 128, content player builder 144 combines at least the generated key based decipher 128 with the decipher key, if applicable, and decoder 148 to form content player 126, block 216. As described earlier, arbitrary values may be provided for the "dissolved" portion of the decipher key to obfuscate and/or redirect. Further, other tamper resistant treatments may be applied to decipher 128 and/or other components of content player 126 to further strengthen content protection.

Referring now to FIG. 2c, on invocation, key based decipher generator 146 first generates an instruction to set the output variable (C) to "1", block 222. Then for the specified portion of the decipher key, key based decipher generator 146 selects a next bit, block 224. Key based decipher generator 146 generates an in-line instruction to set the output variable (C) to its own square modulus n, i.e. C=C*C mod n, block 226. Next, key based decipher generator 146 conditionally generates an in-line instruction to set the output variable (C) to the product of the output variable (C) and an input variable (M) to be deciphered modulus n, i.e. C=C*M mod n, if the selected bit is a "1" bit, block 228.

Next, key based decipher generator 146 determines whether there are more specified bits requiring corresponding hard code to be generated, block 230. If there are, key based decipher generator 146 returns to block 224 and continues the generation process from there. Else, key based decipher generator 146 terminates the generation process.

For embodiments where key based decipher generator 146 is hard coded for only a portion of a decipher key, e.g. xxxx0101, where xxxx is the non-specified portion, and 0101 is the specified portion, the key based decipher generation process further includes generating for the key based decipher 128 a sub-program/module with instructions to compute a) C=C*C Mod n; and
b) C=C*M Mod n if the current bit=1

In other words, for a key based decipher 128 hard coded for the example decipher key 01010101, the key based decipher 128 comprises the following in-line instructions a) C=1
b) C=C*C Mod n;
c) C=C*C Mod n;
d) C=C*M Mod n;
e) C=C*C Mod n;
f) C=C*C Mod n;
g) C=C*M Mod n;
h) C=C*C Mod n;
i) C=C*C Mod n;
j) C=C*M Mod n;
k) C=C*C Mod n;
l) C=C*C Mod n;
m) C=C*M Mod n For the above described example, where the decipher key is 8-bit long, and only the last 4 bits are specified, e.g. xxxx0101, the key based decipher 128 comprises the following in-line instructions a) C=1
b) For j=1 thru 4
c) C=C*C Mod n;
d) C=C*M Mod n if bit(j)=1
e) C=C*C Mod n;
f) C=C*C Mod n;
g) C=C*M Mod n;
h) C=C*C Mod n;
i) C=C*C Mod n; and
j) C=C*M Mod n Any one of a number of programming languages may be employed to practice the present invention. That is, the above mentioned "in-line instructions" may be expressed in the syntax of any one of a number of programming languages known in the art or to be designed. Note that even for hard wired embodiments, generator 146 may generate key based decipher 128 in an intermediate form using one of a number of known or to be designed hardware design language, such as Verilog.

Those skilled in the art will appreciate that in the above examples, the decipher key is purposely kept short for ease of presenting and understanding the invention. In practice, the decipher key is typically significant longer than the 8 bit versions illustrated above. Nevertheless, one skilled in the art will be able to practice the present invention from the foregoing and description to follow. The present invention may be practiced with various embodiments for various deciphering keys with various specified portions, including fully specified deciphering keys.

Referring back to FIG. 2a, block 204, if the request is for building ciphered as well as encoded content 136, production server 142 invokes content generator 150 to generate ciphered as well as encoded content 136, and if applicable, provides the built/re-built content 136 to content server 132. In particular, content generator 150 invokes encoder 154 to encode content 152.

Alternate embodiment of Key Based Decipher Generator

Figure 5:
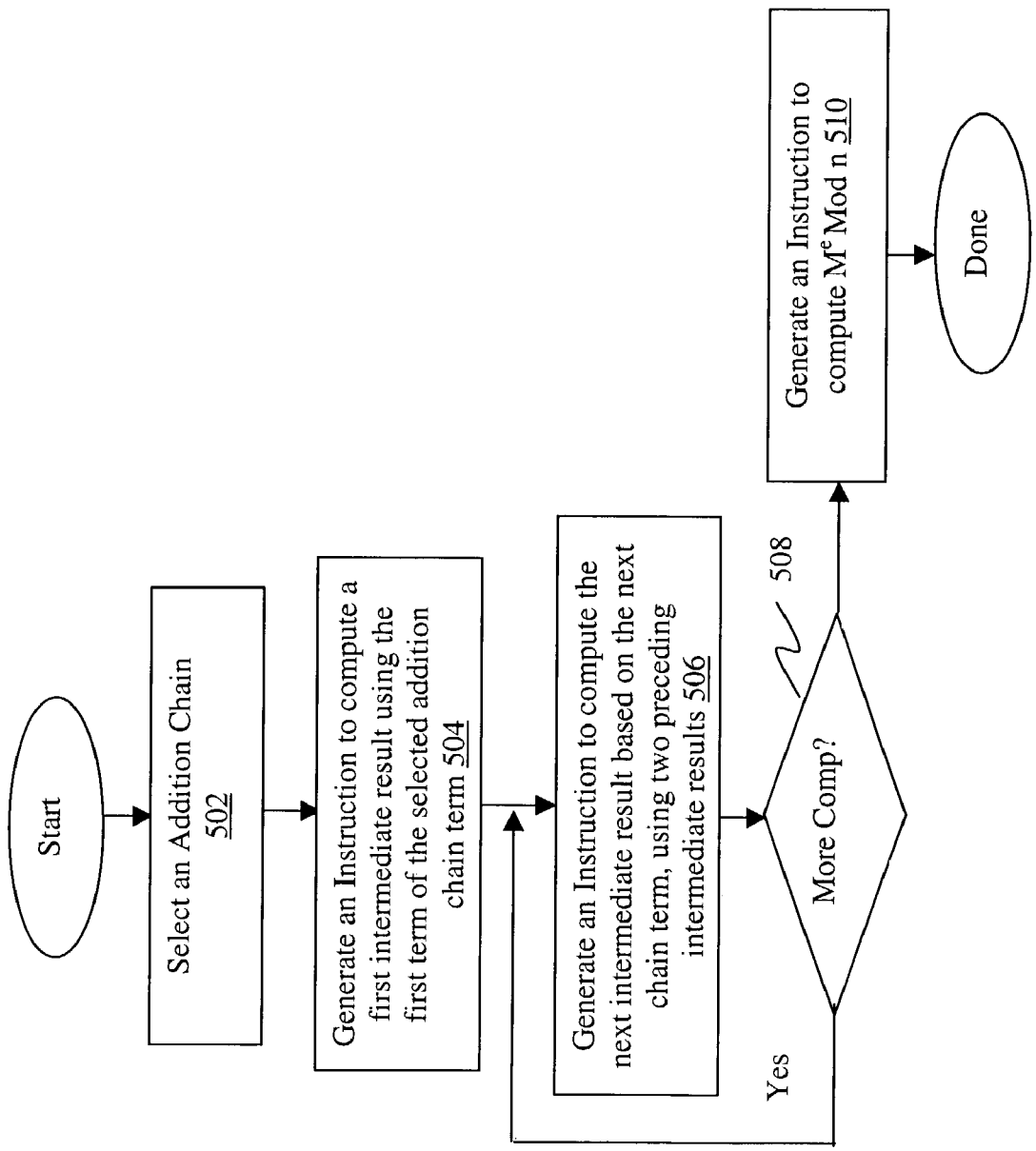
FIG. 5 illustrates an alternate embodiment to generating the key based decipher of the present invention.

FIG. 5 illustrates an alternate embodiment of key based decipher generator 146 for generating key based decipher 128 that is hard coded/wired specifically for a decipher key. The embodiment is based on computing the quantity $M^e$, using an addition chain of e, the decipher key. An addition chain of e is a sequence of terms $a_0, a_1, a_2, \ldots a_r$ with $a_0=1$ and $a_r=e$, and that the sequence is constructed in such a way, for all k, there exists i, j<k, where $a_k=a_i+a_j$ r is referred to as the length of the addition chain, and i may equal j.

The quantity $M^e$ may be computed by following the addition chain of e. That is, by first computing $M^1$, then proceeds to successively compute a number of M to the power $a_k$, based on two preceding terms of M to the power $a_i$ and M to the power $a_j$, where $a_i$ and $a_j$ are members of the addition chain of e, until M to the power $a_k$, i.e. $M^e$, is reached.

For example, if e equals 55, the addition chain for e may be 1 2 3 6 12 13 26 27 54 55

Then, $M^{55}$ may be computed $M^1 \to M^2 \to M^3 \to M^6 \to M^{12} \to M^{13} \to M^{26} \to M^{27} \to M^{54} \to M^{55}$ Note that for each e, there may be more than one addition chain. Preferably, the shortest one is employed, however, not necessarily.

An addition chain for an integer e may be determined using any one of a number of techniques known in the art.

Accordingly, at block 502, on receipt of a decipher key e, key based decipher generator 146 first selects an addition chain of e. Next, at block 504, key based decipher generator 146 generates a first in-line instruction to compute a first intermediate result based on the first term of the selected addition chain of e. Then, at block 506, key based decipher generator 146 generates another in-line instruction to compute a next intermediate result based on the next term of the selected addition chain of e, using two preceding computed intermediate results.

At block 508, key based decipher generator 146 determines if further computation still needed. That is, whether $M^e$ has been reached when the most recent intermediate result is computed. If further computation is needed (i.e. $M^e$ has not been reached), the process returns to block 506; else the process continues at block 510, where an in-line instruction is generated to compute $M^e$ Mod n.

In other words, viewing the embodiment of FIG. 2c and FIG. 5 together, key based decipher generator 146 successively generates a number of in-line instructions to incrementally contribute to the computation of the $M^e$ Mod n. The incremental contributions may be effectuated through a variety of equivalent computation techniques.

Client, Player Distribution Server and Content Server

FIGS. 3a-3c illustrate the operational flow of the relevant aspects of client 112, content player distribution server 122 and content server 132 respective, in accordance with one embodiment each.

As illustrated in FIG. 3a, during operation, client 112 requests distribution server 122 for, and receives content player 126, including key based decipher 128 and decoder 148, block 302. Further, at another point in time during operation, client 112 requests content server 132 for, and receives encoded content 136 (after verification of the legitimacy of content player 126 using key based decipher 128), block 304. In response, content player 126 using decoder 148, decodes the encoded content, block 306. Further, content player 126 renders the recovered, i.e. decoded, content.

As illustrated in FIG. 3b, during operation, on receipt of a request for content player 126, block 322, distribution server 122 (upon satisfying itself with the qualification of the requestor, if applicable, e.g. through tender payment of the proper fees) provides content player 126 to the requesting client 112, including key based decipher 128 and decoder 148, block 324.

Similarly, as illustrated in FIG. 3c, during operation, on receipt of a request for content, block 332, content server 132 first verifies the legitimacy of the requesting content player 126, block 334. As described earlier, while the verification process may be effectuated in any one of a number of known or to be designed manners, the present invention assumes at least deciphering of certain ciphered access control information are involved as part of the process. On verification, distribution server 122 provides encoded content player 126 to the requesting client 112, block 334.

Example Computer System

Figure 4:
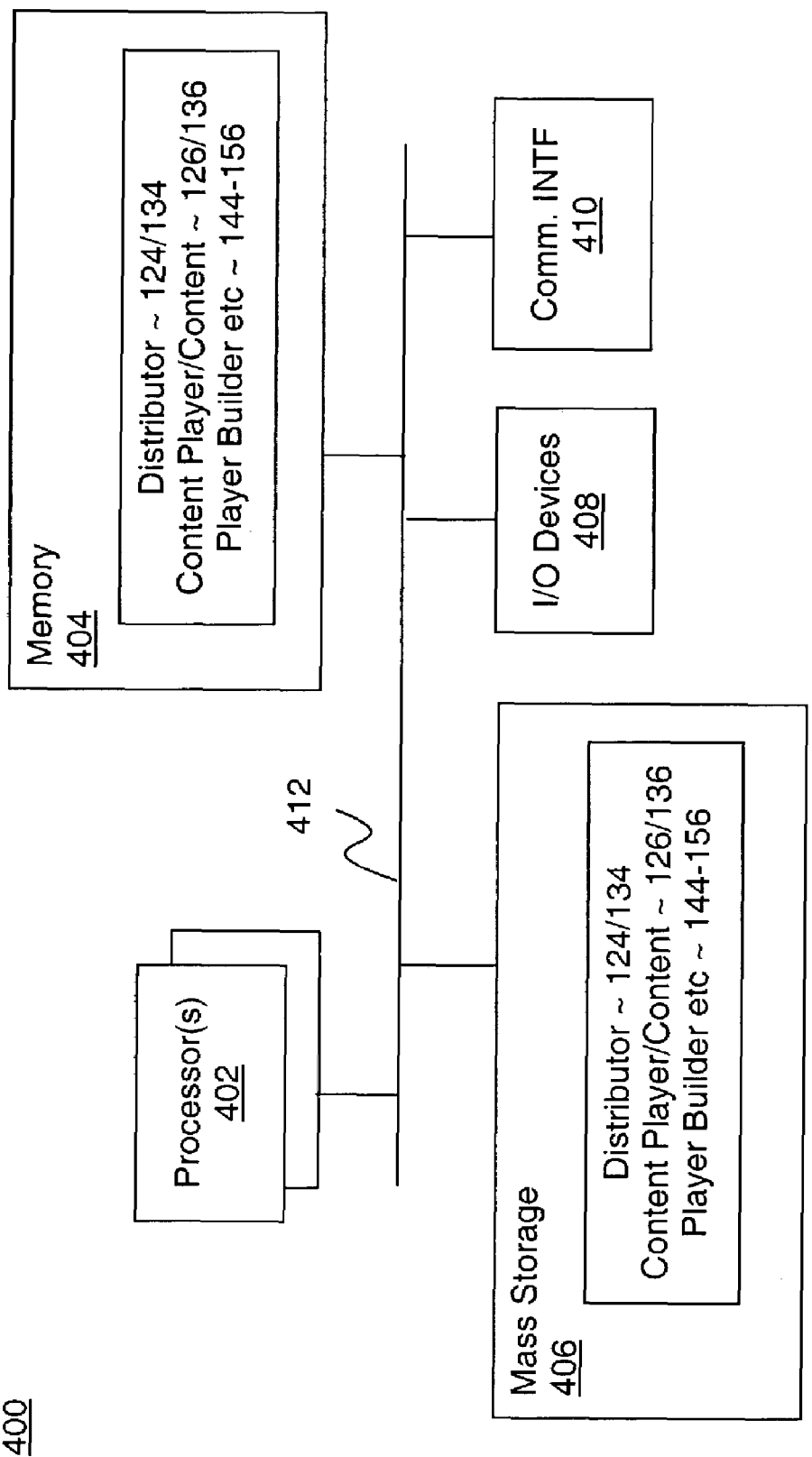
FIG. 4 illustrates an example computing device, suitable for use as either a client device, a distribution server, a content server or a production server, to practice the present invention, in accordance with one embodiment

FIG. 4 illustrates one embodiment of an exemplary digital system suitable for use to practice the present invention, either as a client system or a server system. As a client system, digital system 400 may be a desktop computer system, a laptop computer system, a palm sized computing device, a wireless mobile phone, a set-top box, an Internet appliance and the like. As a server, digital system 400 may a single or a cluster of computer systems.

As shown, exemplary digital system 400 includes one or more processors 402 and system memory 404. Additionally, system 400 includes mass storage devices 406 (such as diskette, hard drive, CDROM and so forth), input/output devices 408 (such as keyboard, cursor control and so forth) and communication interfaces 410 (such as network interface cards, modems and so forth). The elements are coupled to each other via system bus 412, which represents one or more buses. In the case of multiple buses, the buses are bridged by one or more bus bridges (not shown). Each of these elements performs its conventional functions known in the art. In particular, system memory 404 and mass storage 406 are employed to store a working copy and a permanent copy of the programming instructions implementing the teachings of the present invention, i.e. key based decipher generator 146, and so forth. The permanent copy of the programming instructions may be loaded into mass storage 406 in the factory, or in the field, as described earlier, through a distribution medium (not shown) or through communication interface 410 (from a distribution server (not shown). The constitution of these elements 402-412 are known, and accordingly will not be further described.

Conclusion and Epilogue

Thus, it can be seen from the above descriptions, an improved key based decipher, including its generation and usage for content consumption have been described.

While the present invention has been described in terms of the foregoing embodiments and example applications, those skilled in the art will recognize that the invention is not limited to the embodiments and example application described. The present invention can be practiced with modification and alteration within the spirit and scope of the appended claims.

Thus, the description is to be regarded as illustrative instead of restrictive on the present invention.

What is claimed is:

1. An apparatus comprising storage medium having stored therein a plurality of programming instructions designed to implement a decipher to decipher and recover ciphered data, including
    a first in-line instruction specifically designed to incrementally contribute to computation of $M^e$ Mod n once, where M and n are two input variables, and a is a predetermined at least partially unique decipher key; and
    a second in-line instruction, distinct from said first in-line instruction, specifically designed to further incrementally contribute to the computation of $M^e$ Mod n once;
    a third in-line instruction to set an output variable to equal to the square of the output variable modulus n, and
    a fourth in-line instruction to set the output variable to a product of the output variable and an input variable modulus n.
2. The apparatus of claim 1, wherein the in-line instruction is designed to set an output variable to equal to 1; and
    the second in-line instruction is designed to set the output variable to equal to the square of the output variable modulus n.
3. The apparatus of claim 2, wherein the selected one is a third in-line instruction to set the output variable to equal to the square of the output variable modulus n, and the programming instructions further include a fourth in-line instruction to set the output variable to equal to the square of the output variable modulus n.
4. The apparatus of claim 2, wherein the selected one is a third in-line instruction to set the output variable to equal to the square of the output variable modulus n, and the programming instructions further include a fourth in-line instruction to set the output variable to equal to a product of the output variable and the input variable modulus n.
5. The apparatus of claim 2, wherein the selected one is a third and a fourth in-line instruction to first set the output variable to a product of the output variable and an input variable modulus n, and then set the output variable to equal to the square of the output variable modulus n, and the programming instructions further include a fifth in-line instruction to set the output variable to equal to the square of the output variable modulus n.
6. The apparatus of claim 2, wherein the selected one is a third and a fourth in-line instruction to first set the output variable to a product of the output variable and an input variable modulus n, and then set the output variable to equal to the square of the output variable modulus n, and the programming instructions further include a fifth in-line instruction to set the output variable to equal to a product of the output variable and the input variable modulus n.
7. The apparatus of claim 2, wherein the programming instructions further implement a sub-routine of the decipher comprising:
    a first sub-routine instruction to set the output variable to equal to the square of the output variable modulus n, and
    a second sub-routine instruction to conditionally set the output variable to a product of the output variable and an input variable modulus n.
8. The apparatus of claim 1, wherein
    the first in-line instruction is designed to compute a first intermediate result based on a first term of an addition chain of e; and
    the second in-line instruction is designed to compute a second intermediate result based on a second term of the addition chain of e, using one or more previously computed intermediate results.
9. The apparatus of claim 8, wherein the programming instructions further comprise a third in-line instruction designed to compute a third intermediate result based on a third term of the addition chain of e, using one or more previously computed intermediate results.
10. The apparatus of claim 1, wherein the apparatus is a selected one from the group consisting of a palm sized computing device, a wireless mobile phone, a digital personal assistant, a laptop computing device, a desktop computing device, a set-top box, a compact disk player, a digital versatile disk player, a television, and a display monitor.
11. In a computing device, a deciphering method of operation, comprising:
    executing a first in-line instruction specifically designed to incrementally contribute to computation of $M^e$ Mod n, where m and n are two input variables, and e is a predetermined at least partially unique decipher key; and executing a second in-line instruction, distinct from said first in-line instruction, specifically designed to further incrementally contribute to the computation of M.sup.e Mod n once; and executing a third in-line instruction separate and distinct from said second in-line instruction to set an output variable to equal to the square of the output variable modulus n, and executing a fourth in-line instruction to set the output variable to a product of the output variable and an input variable modulus, the fourth in-line instruction being separate and distinct from said second in-line instruction.

12. The method of claim 11, wherein said executing of a first in-line instruction comprises executing a first in-line instruction to set an output variable to equal to 1; and said executing of a second in-line instruction comprises executing a second in-line instruction to set the output variable to equal to the square of the output variable modulus n.

13. The method of claim 12, wherein the selected one being performed is executing a third in-line instruction to set the output variable to equal to the square of the output variable modulus n, and the method further comprises executing a fourth in-line instruction, separate and distinct from the second as well as the third in-line instruction, to set the output variable to equal to the square of the output variable modulus n.

14. The method of claim 12, wherein the selected one being performed is executing a third in-line instruction to set the output variable to equal to the square of the output variable modulus n, and the method further comprises executing a fourth in-line instruction to set the output variable to equal to a product of the output variable and the input variable modulus n.

15. The method of claim 12, wherein the selected one is a third and a fourth in-line instruction to first set the output variable to a product of the output variable and an input variable modulus n, and then set the output variable to equal to the square of the output variable modulus n, and the programming instructions further include a fifth in-line instruction to set the output variable to equal to the square of the output variable modulus n.

16. The method of claim 12, wherein the selected one being performed is a third and a fourth in-line instruction to first set the output variable to a product of the output variable and an input variable modulus n, and then set the output variable to equal to the square of the output variable modulus n, and the method further comprises executing a fifth in-line instruction, separate and distinct from the third in-line instruction, to set the output variable to equal to a product of the output variable and the input variable modulus n.

17. The method of claim 12, wherein the method comprises a first sub-routine instruction to set the output variable to equal to the square of the output variable modulus n, and a second sub-routine instruction to conditionally set the output variable to a product of the output variable and an input variable modulus n.

18. The method of claim 12, wherein said executing of a first in-line instruction comprises executing a first in-line instruction to compute a first intermediate result based on a first term of an addition chain of e; and said executing of a second in-line instruction comprises executing a second in-line instruction to compute a second intermediate result based on a second term of the addition chain of e, using one or more previously computed intermediate results.

19. The method of claim 18, wherein the method further comprises executing a third in-line instruction to compute a third intermediate result based on a third term of the addition chain of e, using one or more previously computed intermediate results.

20. An apparatus comprising:

storage medium having stored therein a first and a second plurality of programming instructions designed to implement a decipher to decipher and recover ciphered data, and a distributor to distribute the decipher responsive to a request respectively, the first programming instructions including a first in-line instruction specifically designed to incrementally contribute to computation of M^e Mod n once, where M and n are two input variables, and e is a predetermined at least partially unique decipher key;

a second in-line instruction, distinct from said first in-line instruction, specifically designed to further incrementally contribute to the computation of M^e Mod n once;

a third in-line instruction to set an output variable to equal to the square of the output variable modulus n, and a fourth in-line instruction to set the output variable to a product of the output variable and an input variable modulus n; and at least one processor coupled to the storage medium to execute at least the second programming instructions.

21. The apparatus of claim 20, wherein the first in-line instruction comprises a first in-line instruction to set an output variable to equal to 1; and the second in-line instruction comprises a second in-line instruction to set the output variable to equal to the square of the output variable modulus n.

22. The apparatus of claim 21, wherein the selected one of the first programming instructions is a third in-line instruction to set the output variable to equal to the square of the output variable modulus n, and the first programming instructions further include a fourth in-line instruction to set the output variable to equal to the square of the output variable modulus n.

23. The apparatus of claim 21, wherein the selected one of the first programming instructions is a third in-line instruction to set the output variable to equal to the square of the output variable modulus ii, and the first programming instructions further include a fourth in-line instruction to set the output variable to equal to a product of the output variable and the input variable modulus n.

24. The apparatus of claim 21, wherein the selected one of the first programming instructions is a third and a fourth in-line instruction to first set the output variable to a product of the output variable and an input variable modulus n, and then set the output variable to equal to the square of the output variable modulus n, and the first programming instructions further include a fifth in-line instruction to set the output variable to equal to the square of the output variable modulus n.

25. The apparatus of claim 21, wherein the selected one of the first programming instructions is a third and a fourth in-line instruction to first set the output variable to a product of the output variable and an input variable modulus n, and then set the output variable to equal to the square of the output variable modulus n, and the first programming instructions further include a fifth in-line instruction to set the output variable to equal to a product of the output variable and the input variable modulus n.

26. The apparatus of claim 20, wherein
the first in-line instruction comprises a first in-line instruction designed to compute a first intermediate result based on a first term of an addition chain of e; and
the second in-line instruction comprises a second in-line instruction designed to compute a second intermediate result based on a second term of the addition chain of e, using one or more previously computed intermediate results.

27. The apparatus of claim 26, wherein the first programming instructions further comprise a third in-line instruction designed to compute a third intermediate result based on a third term of the addition chain of e, using one or more previously computed intermediate results.

28. In a server, a method of operation, comprising
receiving a request for a content player from a requestor; and
in response, providing the requester with the requested content player, and including with the provided content player, a decipher having at least
a first in-line instruction specifically designed to incrementally contribute to computation of $M^e$ Mod n, where m and n are two input variables, and e is a predetermined at least partially unique decipher key, and
a second in-line instruction, distinct from the first in-line instruction, specifically designed to further incrementally contribute to the computation of $M^e$ Mod n once;
a third in-line instruction to set an output variable to equal to the square of the output variable modulus n; and
a fourth in-line instruction to set the output variable to a product of the output variable and an input variable modulus n.

29. The method of claim 28, wherein the first in-line instruction comprises
a first in-line instruction to set an output variable to equal to 1; and
the second in-line instruction comprises a second in-line instruction to set the output variable to equal to the square of the output variable modulus n.

30. The method of claim 29, wherein the selected one of the decipher is a third in-line instruction to set the output variable to equal to the square of the output variable modulus n, and the decipher further includes a fourth in-line instruction to set the output variable to equal to the square of the output variable modulus n.

31. The method of claim 29, wherein the selected one of the decipher is a third in-line instruction to set the output variable to equal to the square of the output variable modulus n, and the decipher further includes a fourth in-line instruction to set the output variable to equal to a product of the output variable and the input variable modulus n.

32. The method of claim 29, wherein the selected one of the decipher is a third and a fourth in-line instruction to first set the output variable to a product of the output variable and an input variable modulus n, and then set the output variable to equal to the square of the output variable modulus n, and the decipher further includes a fifth in-line instruction to set the output variable to equal to the square of the output variable modulus n.

33. The method of claim 29, wherein the selected one of the decipher is a third and a fourth in-line instruction to first set the output variable to a product of the output variable and an input variable modulus n, and then set the output variable to equal to the square of the output variable modulus n, and the decipher further includes a fifth in-line instruction to set the output variable to equal to a product of the output variable and the input variable modulus n.

34. The method of claim 28, wherein
the first in-line instruction comprises a first in-line instruction designed to compute a first intermediate result based on a first term of an addition chain of e; and
the second in-line instruction comprises a second in-line instruction designed to compute a second intermediate result based on a second term of the addition chain of e, using one or more previously computed intermediate results.

35. The method of claim 34, wherein the decipher further comprise a third in-line instruction designed to compute a third intermediate result based on a third term of the addition chain of e, using one or more previously computed intermediate results.

36. An apparatus comprising:
storage medium having stored therein a plurality of programming instructions designed to implement a generator to generate a decipher to decipher ciphered content, using a key, where the decipher pre-absorbed at least a part of the key; and include
a first in-line instruction specifically designed to incrementally contribute to computation of $M^e$ Mod n, where m and n are two input variables, and e is a predetermined at least partially unique decipher key, and
a second in-line instruction, distinct from the first in-line instruction, specifically designed to further incrementally contribute to the computation of $M^e$ Mod n once; and
further designed to implement the generator to generate the decipher for the key by further generating for each of a selected one or more bits of the key, an in-line instruction to set the output variable to equal to the square of the output variable modulus n, and an in-line instruction to set the output variable to a product of the output variable and the input variable modulus n, if the bit of selected one or more bits of the key is a 1 bit; and
at least one processor coupled to the storage medium to execute the programming instructions.

37. The apparatus of claim 36, wherein said programming instructions are designed to implement the generator to generate a decipher for a key by generating a first in-line instruction to set an output variable to equal to 1.

38. The apparatus of claim 37, wherein the programming instructions are designed to implement the generator to generate the decipher for the key by generating for a first bit of the key,
said second in-line instruction to set the output variable to equal to the square of the output variable modulus n; and a third in-line instruction to set the output variable to a product of the output variable and an input variable modulus n, if the first bit of the key is a 1 bit.

39. The apparatus of claim 38, wherein the programming instructions are further designed to implement the generator to generate the decipher for the key by further generating for the second bit of the key
- a fourth/fifth in-line instruction to set the output variable to equal to the square of the output variable modulus n; and
- a fifth/sixth in-line instruction to set the output variable to a product of the output variable and the input variable modulus n, if the second bit of the key is a 1 bit.

40. The apparatus of claim 37, wherein the programming instructions are further designed to implement the generator to generate the decipher for the key by further generating for each bit of the key, an in-line instruction to set the output variable to equal to the square of the output variable modulus n, and an in-line instruction to set the output variable to a product of the output variable and the input variable modulus n, if the bit of the key is a 1 bit.

41. The apparatus of claim 36, wherein the programming instructions are designed to implement the generator to generate the decipher for the key by generating
- said first in-line instruction designed to compute a first intermediate result based on a first term of an addition chain of e; and
- said second in-line instruction designed to compute a second intermediate result based on a second term of the addition chain of e, using one or more previously computed intermediate results.

42. The apparatus of claim 41, wherein the programming instructions are further designed to implement the generator to additionally generate a third in-line instruction designed to compute a third intermediate result based on a third term of the addition chain of e, using one or more previously computed intermediate results.

43. In a server, a method of operation comprising:
receiving a key;
generating a decipher to decipher ciphered data using the key, with the decipher integrally pre-absorbed at least a part of the key, comprising:
- generating a first in-line instruction specifically designed to incrementally contribute to computation of M.sup.e Mod n, where m and n are two input variables, and e is a predetermined at least partially unique decipher key, and
- generating a second in-line instruction, distinct from the first in-line instruction, specifically designed to further incrementally contribute to the computation of M.sup.e Mod n once;
- generating a third in-line instruction to set an output variable to equal to the square of the output variable modulus n, and
- generating a fourth in-line instruction to set the output variable to a product of the output variable and an input variable modulus n.

44. The method of claim 43, wherein said a first in-line instruction to sets an output variable to equal to 1.

45. The method of claim 44, wherein said generating of a decipher further comprises generating for each of a selected one or more bits of the key, an in-line instruction to set the output variable to equal to the square of the output variable modulus n, and an in-line instruction to set the output variable to a product of the output variable and the input variable modulus n, if the bit of selected one or more bits of the key is a 1 bit.

46. The method of claim 45 wherein said generating of a decipher further comprises generating for a second bit of the key
- a fifth/sixth in-line instruction to set the output variable to equal to the square of the output variable modulus n; and
- a sixth/seventh in-line instruction to set the output variable to a product of the output variable and the input variable modulus n, if the second bit of the key is a 1 bit.

47. The method of claim 44, wherein said generating of a decipher comprises generating for each bit of the key, an in-line instruction to set the output variable to equal to the square of the output variable modulus n, and an in-line instruction to set the output variable to a product of the output variable and the input variable modulus n, if the bit of the key is a 1 bit.

48. The method of claim 43, wherein said generating of a decipher comprises generating
- wherein said a first in-line instruction is designed to compute a first intermediate result based on a first term of an addition chain of e; and
- wherein said a second in-line instruction is designed to compute a second intermediate result based on a second term of the addition chain of e, using one or more previously computed intermediate results.

49. The method of claim 48, wherein said generating of a decipher further comprises generating an additional in-line instruction designed to compute an additional intermediate result based on an additional term of the addition chain of e, using one or more previously computed intermediate results.

* * * * *

UNITED STATES PATENT AND TRADEMARK OFFICE
CERTIFICATE OF CORRECTION

PATENT NO. : 7,263,185 B2
APPLICATION NO. : 10/377346
DATED : August 28, 2007
INVENTOR(S) : Xiadong Fu It is certified that error appears in the above-identified patent and that said Letters Patent is hereby corrected as shown below:

Column 9, Line 55, "Me" should be changed to --$M^e$--; Line 56, "a is a" should be changed to --e is a--; Line 61, the text "M^e" should be changed to --$M^e$--; Line 66, the following text should be deleted "n." and the following text should be inserted at the end of Claim 1:
--n; and at least one processor coupled to the storage medium to execute the programming instructions.--

Column 10, Line 1, "the in-line instruction" should be changed to --the first in-line instruction--; Line 67, the text "M.sup.e" should read --$M^e$--.

Column 11, Line 1, "Mod n, where m" should read --Mod n once, where M--; Line 6, the text "M.sup.e" should read --$M^e$--;

Column 12, Line 25, the text "M^e" should read --$M^e$--; Line 31, the text "M^e" should read --$M^e$--; Line 58, the text "ii" should read --n--;

Column 13, Line 34, the text "M.sup.e" should read --$M^e$--; Line 35, the text "Mod n, where m" should read --Mod n once, where M--; Line 41, the text "M.sup.e" should read --$M^e$--.

Column 14, Line 38, the text "M.sup.e" should read --$M^e$--; Line 45, the text "M.sup.e" should read --$M^e$--.

Column 15, Line 44, the text "M.sup.e" should read --$M^e$--; Line 44, the text "where m" should read --where M--; Line 50, the text "M.sup.e" should read --$M^e$--.

Signed and Sealed this

Eleventh Day of March, 2008

JON W. DUDAS
*Director of the United States Patent and Trademark Office*